(12) United States Patent
Harder

(10) Patent No.: US 8,366,091 B2
(45) Date of Patent: Feb. 5, 2013

(54) AUTOMATIC STOP GAUGE FOR POSITIONING A WORKPIECE RELATIVE TO THE WORKING MEMBER OF A TOOL

(76) Inventor: Melvin Reggie Harder, Steinbach (CA)

( * ) Notice: Subject to any disclaimer, the term of this patent is extended or adjusted under 35 U.S.C. 154(b) by 0 days.

(21) Appl. No.: 13/359,874

(22) Filed: Jan. 27, 2012

(65) Prior Publication Data

US 2012/0248675 A1    Oct. 4, 2012

(30) Foreign Application Priority Data

Apr. 4, 2011    (CA) ...................................... 2736329

(51) Int. Cl.
*B23Q 3/02*    (2006.01)
*B27B 27/00*    (2006.01)
(52) U.S. Cl. ............................ 269/315; 269/900; 269/71
(58) Field of Classification Search .................. 269/315, 269/289 R, 900, 309–310, 71, 60
See application file for complete search history.

(56) References Cited

U.S. PATENT DOCUMENTS

| 615,991 | A | 12/1898 | Ingman |
| 751,121 | A | 2/1904 | Tidey |
| 957,779 | A | 5/1910 | Leaver, Jr. |
| 1,504,248 | A | 8/1924 | Johnson |
| 4,972,749 | A | 11/1990 | Grove |
| 7,464,737 | B2 | 12/2008 | Duginske |

*Primary Examiner* — Lee D Wilson
(74) *Attorney, Agent, or Firm* — Kyle R. Satterthwaite; Ryan W. Dupuis; Ade & Company Inc.

(57) ABSTRACT

An automatic stop gauge used in woodworking to facilitate the cutting of multiple workpieces to the same length, or working of the pieces at equal positions along each, quickly and accurately has a plurality of stops, moveably mounted on a beam-like fence, which is in turn aligned with and connected to the existing top fence of a cutting or drilling tool when present "Pin" type stops deploy in succession by means of gravity from holes drilled in the beam at incremental spacings of one or more inter-hole distances. An operator presses a work piece against the beam which retracts one or more of the pins from its stop-defining position projecting from the beam, and with lateral movement of the work piece toward the working member of the tool, as guided by the beam, pins redeploy one at a time, to each provide a new stop position for the workpiece.

20 Claims, 4 Drawing Sheets

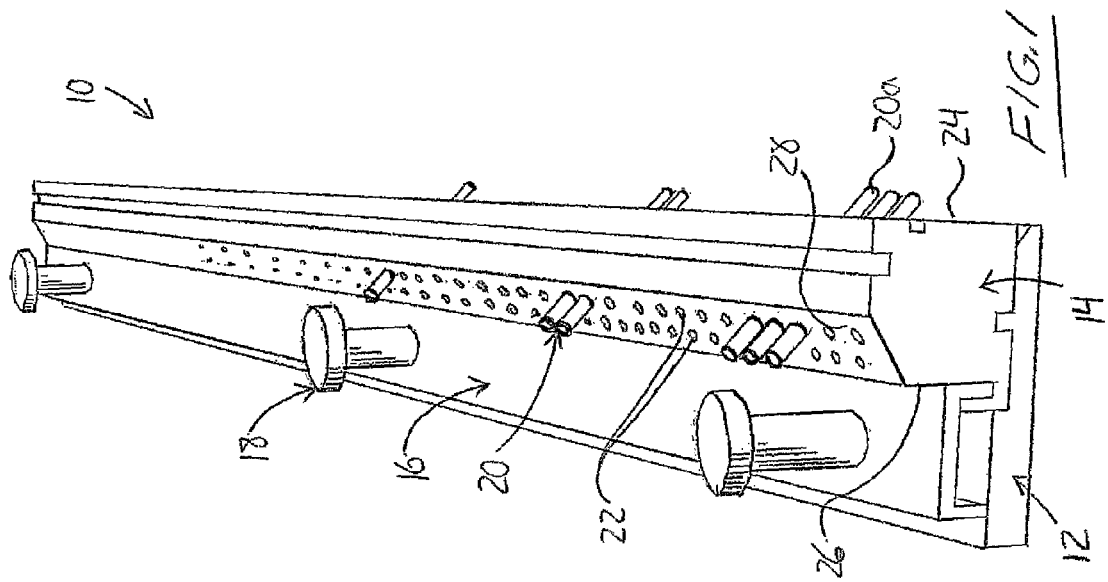
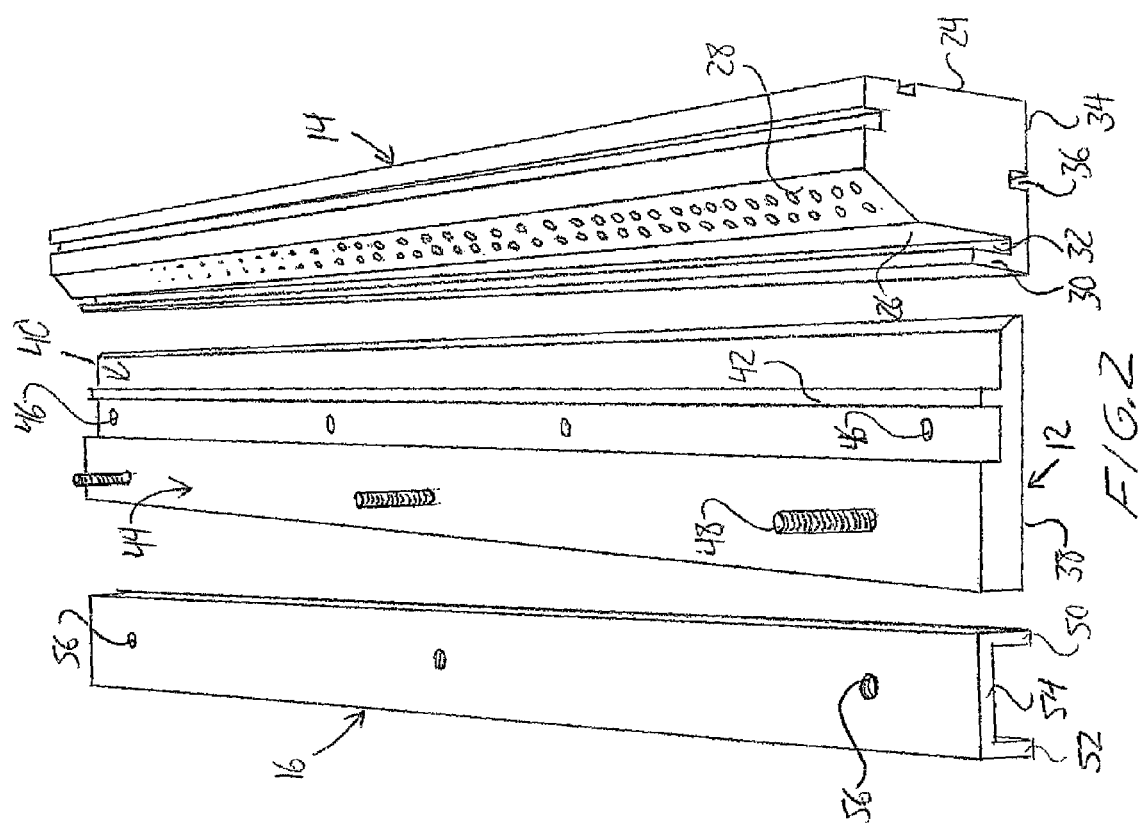

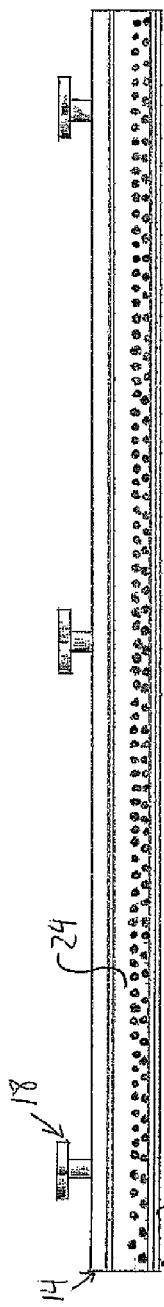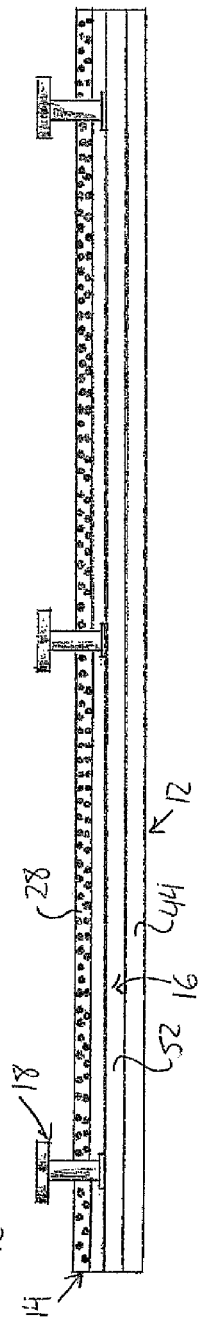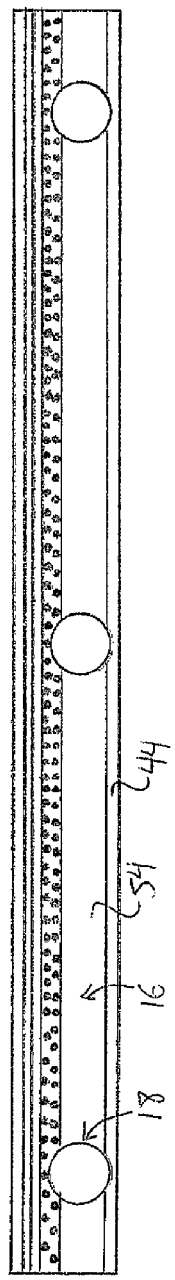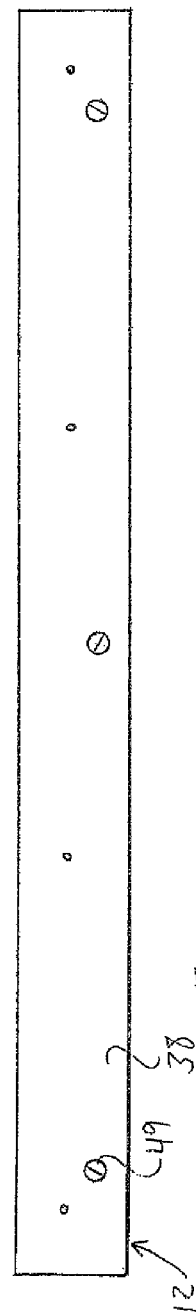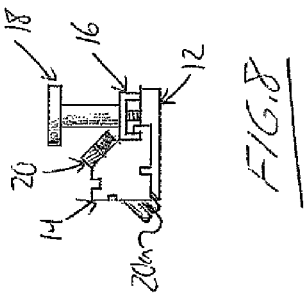

AUTOMATIC STOP GAUGE FOR POSITIONING A WORKPIECE RELATIVE TO THE WORKING MEMBER OF A TOOL

CROSS REFERENCE TO RELATED APPLICATIONS

This application claims benefit under 35 U.S.C. 119(a) of Canadian Patent Application Serial No. 2,736,329, filed Apr. 4, 2011.

FIELD OF THE INVENTION

The present invention relates to an apparatus used with stationary wood or metal working tools, primarily for the purpose of cutting or working multiple pieces of material requiring formation of the same cuts or features at the same predetermined position(s) along each piece, for example to cut multiple pieces of material to the same length.

BACKGROUND OF THE INVENTION

Stops gauges are typically devices where one or more stops are moveably mounted on a beam or track that is also to serve as a back fence for guiding a work piece along a linear path leading to the working member of a tool. The stop and track assembly is connected in alignment to the existing back fence of a cutting tool, where such an existing fence is present. The purpose of the apparatus is to allow the operator to cut work pieces into pieces of the same length productively. Generally the stops have one or more mechanical joints that need to be manipulated each time a different measurement is required. Mechanical joints are more expensive to produce, a course for play and inaccuracy and points to be jammed by chips. Larger stop systems make the entire assembly bulkier and less versatile on a variety of machines.

Examples of previously known stop gauges include those disclosed in U.S. Pat. Nos. 615,991, 751,121, 957,779, 1,504,248, 4,972,749 and 7,464,737. While these stop gauges feature automatically deploying stops that are biased into positions projecting from the fence to form a stop against which the end of the workpiece can abut, they each employ either pivotal hinge-like joints or spring loaded configurations to achieve this self-deploying functionality of each stop.

Applicant has developed a unique stop gauge that achieves automatic gravity-induced stop deployment without the need for springs or pivotal joints at the stops.

SUMMARY OF THE INVENTION

According to a first aspect of the invention there is provided an automatic stop gauge for positioning a workpiece along a workpiece support surface of a tool setup to position the workpiece relative to a working member of the tool for engagement of the workpiece thereby at predetermined positions along the workpiece, the stop gauge comprising:

a rail extending in a longitudinal direction and arranged for coupling to the workpiece support surface;

a series of holes extending through the rail in a transverse direction oriented downwardly cross-wise to the longitudinal direction, the holes in the series having predetermined spacing between adjacent holes along the longitudinal direction; and a set of pins configured to be received within different ones of said holes in a free sliding condition in which each pin is freely slidable along the hole between a stop position in which a lower end of the pin projects outwardly from the rail and a retracted position in which the pin does not project outwardly from the rail;

wherein the downward direction of the holes gravitationally biases each pin into the stop position when situated in the free sliding condition in one of the holes.

Preferably the pins comprise shaft portions of cross-section small enough to fit within the holes and head portions too large to fit within the holes, whereby in the stop position, the shaft portion of each pin defines the lower end projecting from the rail and the head portion seats against the rail at end of the hole opposite that from which the lower end projects.

Preferably the predetermined spacing between adjacent holes is equal for each pair of adjacent holes in the series.

Preferably the series of hole comprises two rows of holes, holes of one row each being located between a pair of adjacent holes in the other row in the longitudinal direction.

Preferably spacing apart of adjacent holes in the longitudinal direction in the one row is equal to spacing apart of adjacent holes in the longitudinal direction in the other row.

Preferably a first end space between a first end hole adjacent a first end of the rail and said first end of the rail and a second end space between a second end hole adjacent a second end of the rail and said second end are complimentary to maintain the predetermined spacing between adjacent holes among two series of holes in two of said rails when placed adjacent one another first end to second end.

Preferably each pair of adjacent holes in the series is equal, and the first and second end spaces each equal half of said distance.

Preferably there is provided a base arranged to mount atop the workpiece support surface and to carry the rail atop the base at user-selectable positions thereon to adjust a position of the rail over the workpiece support surface.

Preferably the rail is slidable along the base to different user-selectable positions and selectively lockable to the base in any of said user-selectable positions.

Preferably a bottom of the rail and a top of the base are profiled in a matable fashion defining a guide to direct sliding of the rail along the base in the longitudinal dimension.

Preferably there are provided tongue and groove profiles defined on opposing ones of the rail and the base to define a mating tongue and groove pair extending in the longitudinal direction.

Preferably there is provided a locking device comprising a clamping member arranged to engage onto the rail from thereabove and a clamping mechanism operable to tighten the clamping member downwardly onto the rail to clamp it against the base therebeneath.

Preferably the clamping member comprises a channel of inverted U-shaped cross-section having a first downwardly depending leg engagable into an upwardly opening slot in the rail adjacent a second side thereof opposite opposite a first side where the lower ends of the pins project from the rail in the stop position and a second downwardly depending leg at an end of a central span opposite the first leg for placement against a lateral portion the base extending laterally outward past the second side of the rail.

Preferably the clamping mechanism comprises threaded posts extending upward from the lateral portion for receipt of said threaded posts through holes in the central span of the channel, and matingly threaded pieces threadable onto the posts from over the central span of the channel to clamp the channel against the rail and the base at the longitudinal slot and lateral portion respectively.

Preferably the threaded pieces comprise knob shaped members each comprising an internally threaded stem portion for engagement of external threads of the threaded post and a cap portion of larger diameter atop the stem portion for presenting a user grip for manual rotation.

Preferably there are provided fastener holes extending downwardly through the base for receipt of threaded fasteners therethrough to anchor the base to the working surface.

Each pin may be removably insertable among different holes in the series and manually withdrawable therefrom for selective repositioning of pins for different operations of the tool.

The number of holes in the series may exceed the number of pins in the set.

The rail may define a fence presenting a workpiece bearing surface extending in said longitudinal direction along one side of the fence, the series of holes each extending obliquely downward through the fence member toward and through the workpiece bearing surface and the lower end of each pin, in the stop position, projecting outwardly past the workpiece bearing face of the fence member.

In such instance, preferably the rail comprises a sloped outer surface at ends of the holes opposite the work bearing surface, the sloped outer surface being normal to the transverse direction of said holes.

According to a second aspect of the invention there is provided an automatic stop gauge for positioning a workpiece along a workpiece support surface of a tool setup to position the workpiece relative to a working member of the tool for engagement of the workpiece thereby at predetermined positions along the workpiece, the stop gauge comprising:

a fence member extending in a longitudinal direction and presenting workpiece bearing surface extending in said longitudinal direction along an upright side of the fence member;

a series of holes extending through the fence member in a transverse direction oriented cross-wise to the longitudinal direction and sloping downwardly toward the upright side of the rail member at an oblique angle thereto, the holes in the series having predetermined spacing between adjacent holes along the longitudinal direction; and a set of pins configured to be received within different ones of said holes in a free sliding condition in which each pin is freely slidable along the hole between a stop position in which a lower end of the pin projects outwardly past the workpiece bearing face of the fence member and a retracted position in which the pin does not project outwardly past the bearing face of the fence member;

wherein the obliquely downward transverse direction of the holes gravitationally biases each pin toward the stop position when situated in the free sliding condition in one of the holes.

In use of the stop gauge with the tool setup, the upright side of the fence member stands upright from the workpiece support surface and a lower end of each hole in the fence member is positioned at a height spaced above the work surface.

BRIEF DESCRIPTION OF THE DRAWINGS

In the accompanying drawings, which illustrate an exemplary embodiment of the present invention:

FIG. 1 is a perspective view of a stop gauge of the present invention.

FIG. 2 is a disassembled view of components of the stop gauge of FIG. 1.

FIG. 3 is a front elevational view of the stop gauge.

FIG. 4 is a rear elevational view of the stop gauge.

FIG. 5 is an overhead plan view of the stop gauge.

FIG. 6 is a bottom plan view of the stop gauge.

FIG. 8 is an opposite end elevational view of the stop gauge.

FIG. 9 is a perspective view illustrating use of the stop gauge to position a workpiece therealong.

DETAILED DESCRIPTION

Figure 7:
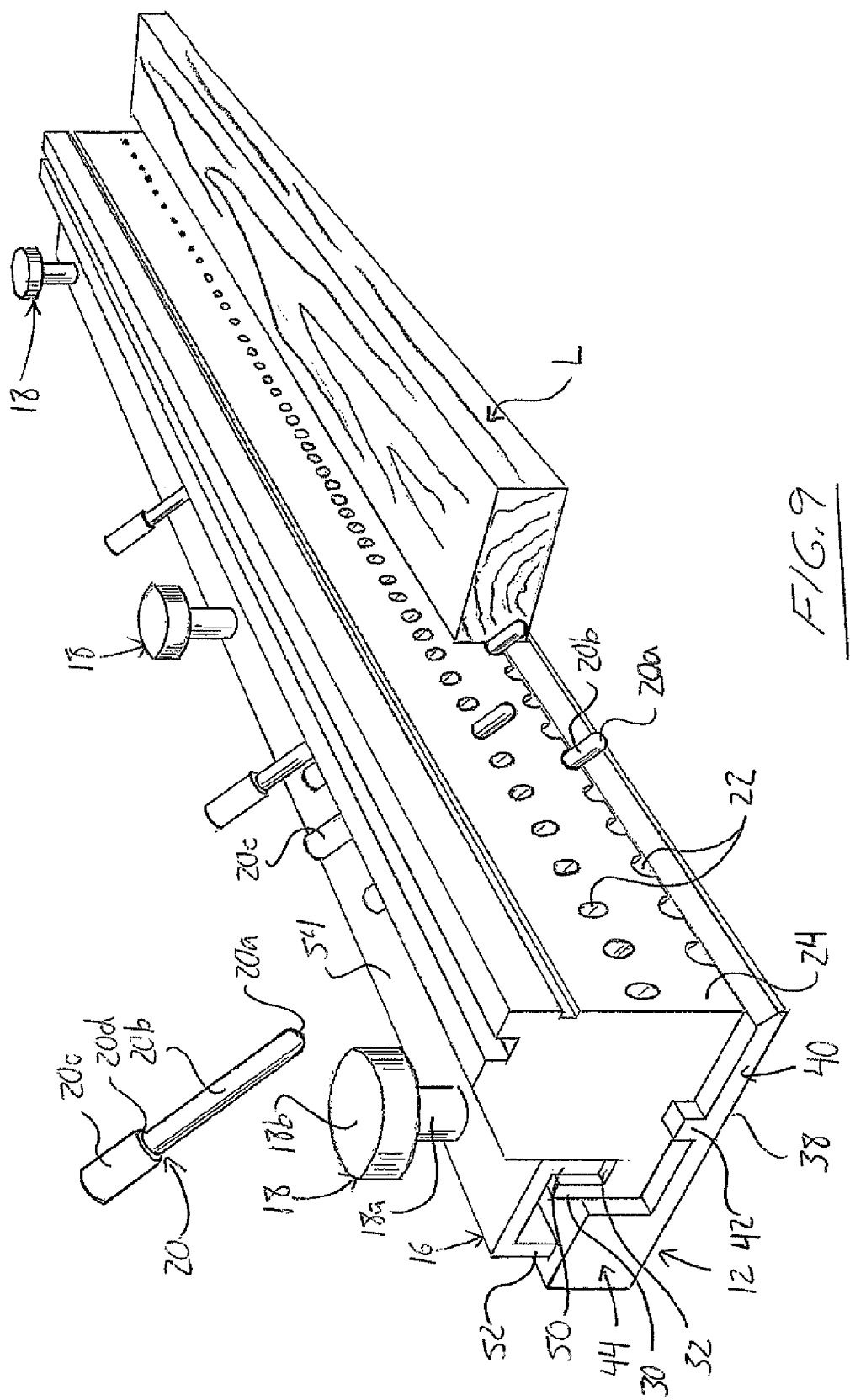
FIG. 7 is an end elevational view of the stop gauge.

FIG. 1 shows an automatic stop gauge 10 of the present invention, which with additional reference to FIG. 2 is primarily made up of a base 12, a fence 14, a clamp member 16, clamp knobs 18 and a set of pins 20. The base is secured atop the work surface of a stationary power tool such as a drill press, chop saw, table saw, radial arm saw, etc. and to in turn support the fence 14 thereon. The fence 14 is slidable along the base 12 and selectively lockable thereto in any position therealong through use of the clamp knobs 18 to tighten the clamp member 16 down against the fence 14 and base 12 to clamp the fence 14 in place between the clamp member 16 and the base 12, thereby reversibly fixing the fence 14 to the base at the selected position therealong. The fence 14 features a series of parallel and equally spaced apart through-holes 22 therein that slope downwardly through the fence 14 at an oblique angle, and the pins 20 are each insertable into any of these holes 22 so that a lower end of the pin 20a projects outwardly from a flat vertical side 24 of the fence 14 to form a stop against which a workpiece, such as the piece of lumber L show in FIG. 9, can have one of its ends butted up against this projecting portion of the pin and held thereagainst to maintain a stationary position of the workpiece during a particular cutting, drilling or other tool operation thereon.

A series of pins can be inserted at selected holes in the series to define a number of desired stop positions for the workpiece according to where holes or cuts are required along the length of the workpiece. With such pins inserted, the workpiece has a lengthwise edge thereof pushed up against the flat vertical side 24 of the fence, thereby displacing any pins engaged by the edge upwardly through the respective fence holes. One end of the workpiece is then slid along the fence 14 toward the position of the working member (e.g. drill bit, saw blade, etc.) of the tool along the worksurface, and as soon as the opposite end of the workpiece passes the hole of the first pin in the fence, gravity automatically returns that pin to its useful position projecting downwardly and outwardly past the vertical side 24 of the fence. The end of the workpiece is manually held back against this now-projecting pin while maintaining pressure of the workpiece's lengthwise edge against the vertical side 24 of the fence, thereby wedging a corner of the workpiece into this corner formed between the fence's vertical side 24 and the pin projecting therefrom to maintain the workpiece in this stationary position while the cutting or drilling operation is performed at the part of the workpiece positioned at the working member by this user-predetermined position of the workpiece along the work surface.

Opposite the vertical side 24 through which the pins lower ends 20a project when in use as workpiece stops, the fence 14 features a shorter vertical wall 26, from the top end of which the uniform cross-section of the fence 14 obliquely slopes linearly upward and toward the taller vertical side 24 to define an obliquely oriented upwardly facing planar surface 28 of the fence 14. Each pin receiving hole 22 passes through the fence from this oblique surface 28 in a direction normal thereto, and completes its passage through the fence at the taller vertical side 24 that presents a planar face against which the workpiece bears during use of the stop gauge.

Below the vertical wall 26, the bottom of the fence 14 spans laterally past this wall 26 a short distance, where an even shorter vertical wall 30 of the fence juts upward to define the side thereof opposite the tall vertical side 24. The space left between these short and medium walls 30, 26 of the fence 14 defines a longitudinal slot 32 extending the full length of the elongate fence 14 adjacent the respective side thereof. The bottom 34 of the fence 14 is substantially planar and horizontal with the exception of a rectangular slot or groove 36 recessed upwardly into it and extending the full length of the fence 14 parallel to each of the tall vertical side 24, the medium and short walls 26, 30 and the upwardly opening slot 32 therebetween.

As perhaps best shown in FIG. 2, the base 12 features a horizontally planar flat bottom surface 38, and a stepped top surface that may be considered to be divided into main portions of the base, each spanning a full length thereof.

A first portion 40 spans approximately half the width of the base and, with the exception of a tongue 42 of rectangular cross-section linearly spanning the full length of the base 40 at approximately midway across the portion 40, is horizontally planar at its upper surface and has a height less than the remaining other portion 44 of the base. The width of this first portion 40 and the position of the tongue 42 thereacross corresponds to the full width of the fence 14 and the position of the downwardly opening slot or groove 36 in the bottom thereof. Accordingly, the tongue 42 projects upwardly into the groove 36 of the fence when the fence 14 is seated on this first portion 40 of the base 12. The profiles of the fence bottom and the topside of the first base portion 40 matingly conform to one another to fit together in this matter so as to enable sliding of the fence along the tongue 42 of the base to allow relative positioning of the fence 14 along the length of the base. The parallel tongue and groove thus cooperate to substantially limit relative movement between the base and fence pieces to a purely longitudinal displacement between them. It will be appreciated that similar functionality can alternatively be achieved by a downward depending tongue on the fence and an upwardly opening slot in the base.

The first portion 40 of the base 12, being substantially equal or slightly less than the fence 14 in width, doesn't project laterally outward past the vertical side 24 of the fence 14, thereby avoiding interference with flush fitting and sliding of the workpiece against that side of the fence during use of the gauge. The fit of the fence portion on the side of the groove 36 opposite the vertical side 24 into the space between the tongue 42 and the step in the base's topside, and likewise the fit of the tongue itself within the groove, is dimensioned for a close but non-interfering fit to balance slidability with positioning accuracy for maintaining the parallel alignment of the fence and base. Countersunk or counterbored through holes 46 extend vertically through the first portion 40 of the base 12 between the tongue and the second portion 44 at spaced positions along the base for nested receipt of threaded fasteners therein from above to fasten the base 12 to the work surface of the tool setup.

The second portion or half 44 of the base 12 is horizontally planar at its top surface and features a plurality e.g. (three in the illustrated embodiment, although the number may vary) vertically oriented, externally threaded posts 48 projecting upward from this top surface. With reference to FIG. 6, these posts may be provided by the threaded shafts of bolts or machine screws 49 passed upwardly through the base 12 via vertical holes counterbored in the bottom of the base to recess the heads of these fasteners into the underside of the base, where the heads are fixed to the base to prevent sliding of the fasteners out of the base or turning of the posts when engaged by the knobs 18 as described herein further below.

Still referring to FIG. 2, the clamp member 16 is a channel of inverted U-shaped cross-section featuring first and second vertical legs 50, 52 depending downwardly from a horizontal central span 54. Holes 56 extending vertically through the central span 54 of the channel member 16 fit respectively over the threaded posts 48 projecting upward from the second portion 44 of the base 12 when the channel member 16 is lowered toward the base's second portion 44 from thereover in longitudinal alignment therewith. The first leg 50 of the channel clamp member 16 fits into the upwardly opening slot 32 of the fence 14 to sit against the bottom of the slot and support the central span 54 at a height spanning laterally over the short outer wall 30 of the fence 14. On the side of the posts 48 opposite the fence 14, the second leg 52 of the channel member 16 depends downward from the central span 54 to sit atop the planar top surface of the base's second portion 44.

To clamp the fence 14 in a selected position along the length of the base 12, a clamp knob 18 is threaded onto each threaded post 48 located at a position along the base that is also occupied by the fence 14 in its currently-selected longitudinal position of the fence. Each knob features a cylindrical stem portion 18a that is internally threaded to mate with the external threading of any of the posts 48 and a cap or head portion 18b that is larger than the stem portion so as to present an outer circumference or periphery outward from that of the stem 18a for improved manual gripping and rotational torque to drive rotation of the knob for engagement with the respective post 48. Under sufficient threading of the knob 18 onto the post 48, the bottom end of the knob's stem portion 18a reaches the top surface of the channel member's horizontal central span 54, and further tightening thus presses downward on the channel member, forcing the downward depending legs 50, 52 against the fence 14 at the bottom of the upward facing slot 32 therein and against the second portion 44 of the base 12 extending laterally beyond the respective side of the fence 14. The fence 14 is thus clamped downwardly in place against the base 12 by the threading of the knobs 18 on the posts to clamp the channel member against the fence from above the slot therein. This clamping mechanism defined through the cooperation of the base's posts with the knobs and the channel member thus enables the user to lock in a selected position of the fence along the base without forming any obstacle to or inference with access to the pin holes at the obliquely upward facing surface 28 of the fence.

Each pin 20 features a shaft portion 20b that defines the distal end 20a of the pin that projects through the fence hole 22 when in use to form a workpiece stop (FIG. 9). A largest diameter of the shaft portion 20b is small enough to slidingly fit within any of the holes 22 in the fence. In the illustrated embodiment, each pin is rounded at the distal end 20a but features a cylindrical shaft portion 20b of otherwise uniform diameter, which is thus sized to be slightly smaller in diameter than the cylindrical bore of the equally dimensioned through holes in the fence. At the end of the shaft portion 20b opposite the lower end 20a, each pin 20 features a head portion 20c that is concentric with, but larger in diameter, than the shaft portion 20b. The diameter of the pin head's circumference is greater than the bore diameter of each hole 22 in the fence 14, and the length of the shaft portion 22b is greater than the length of the through hole of the fence, so that when a pin shaft is inserted into a selected hole from the sloped fence surface 28, it will slide through the hole until the distal end 20a of the shaft portion 20b projects past the vertical side 24 of the fence and the shoulder 20d formed between the pin shaft and larger pin head becomes seated on the sloped surface 28 of the fence. Gravity biases each pin into this deployed position projecting from the fence due to the sloped orientation of the holes.

Figure 10:
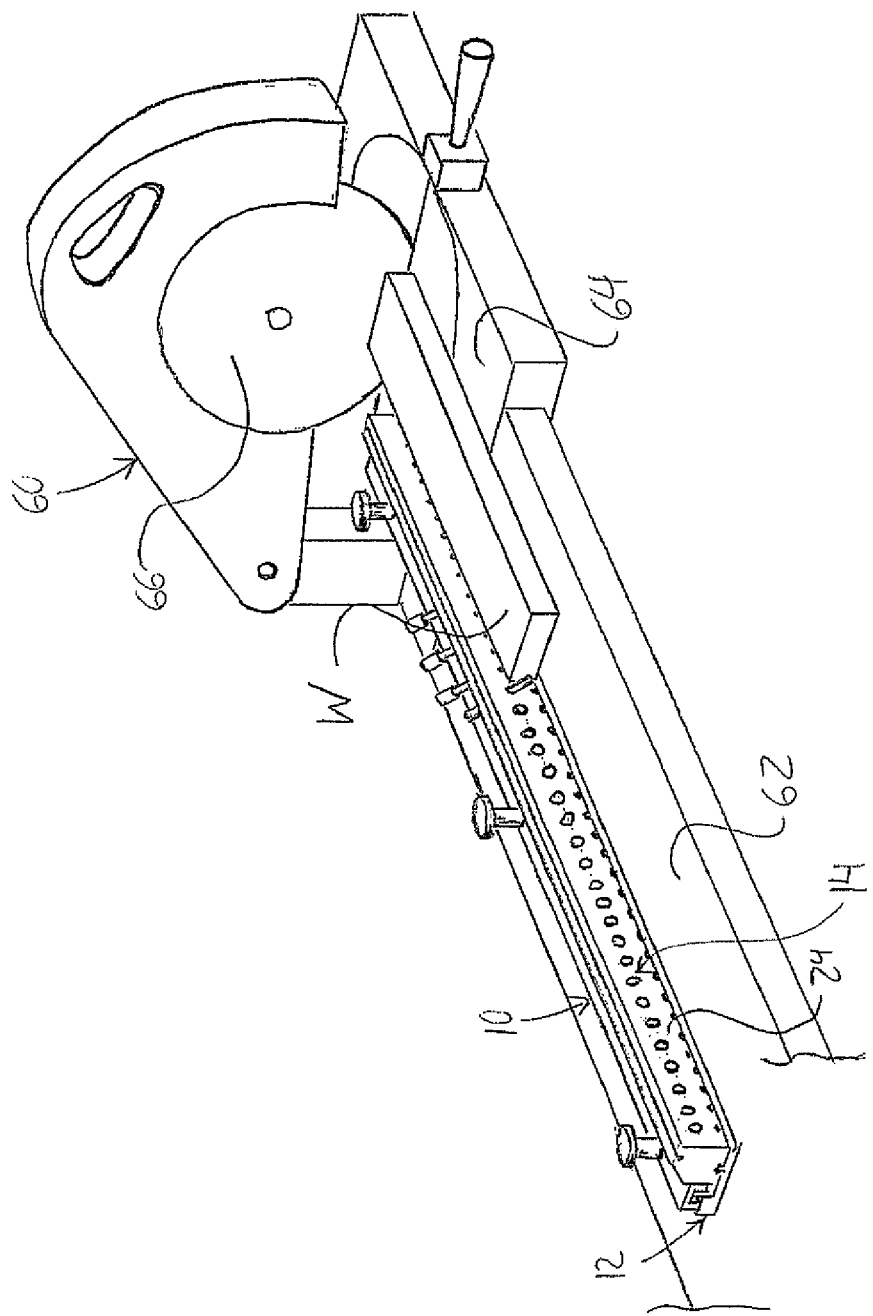
FIG. 10 is a perspective view illustrating use of the stop gauge to position a workpiece along a base and extension table of a chop saw.

FIG. 10 illustrates use of the stop gauge 10 with a chop saw 60 to enable cutting of multiple workplaces at the same location along the length of each workpiece to form identical sets of smaller pieces, one set from each workpiece W. Via the fastener holes 46, the base 12 of the stop gauge 10 is screwed down onto, or bolted through, the flat table-top of an extension table 62 extending horizontally from the base 64 of the chop saw in a lateral direction perpendicularly crossing the working vertical plane of the saw blade 66. To avoid the need to drive self-tapping fasteners into the work surface, or to drill holes therein for passage of bolts or machine screws therethrough, other embodiments may be designed to allow clamping of the base to the worksurface, for example having a larger second portion extending laterally outward from under the clamp member 16 to present a clampable surface. The base 12 is aligned with this direction so that the longitudinal dimension of the base is likewise perpendicular to the blade's cutting plane, and therefore so is the longitudinal dimension of the fence 14, once mounted atop the base, to the engagement of the longitudinally oriented tongue and groove sliding guide between the base and the fence. In a conventional manner, the top surface of the chop saw extension table 62 provides a coplanar extension of the workpiece support surface defined by the planar topside of the chop saw base 64. As shown, the stop gauge may overlie parts of both the chop saw base and the extension table.

After installation of the base and clamping of the fence thereon at the desired position therealong to situate pin-accommodating holes of the fence at desired perpendicularly lateral distances from the plane of the saw blade to mark lengths at which the workpiece will be cut from one end thereof, the saw operator inserts pins into these selectively positioned holes and pushes the lengthwise edge of the workpiece up against the vertical side 24 of the fence 14 over at least a portion of the fence's length at which these inserted pins reside. This retracts the pins from their stop-defining positions projecting outward from the vertical side face 24 of the fence 14. The workpiece is slid along the horizontal work surface and the vertical side face 24 of the fence to displace the end of the workpiece furthest from the saw blade on the gauge-equipped side thereof toward the saw blade 66 until this end of the workpiece passes the first pin-receiving hole in the fence, to which the pin responds by sliding back down through the hole under the action of gravity to once again project from the fence's vertical side 24, as shown in FIG. 10. The operator uses one hand to continue to hold the workpiece against the vertical side 24 of the fence while simultaneously pushing it laterally away from the saw blade against this now-projecting first pin. The operator uses the other hand to perform the first cut with the chop saw, knowing that this bracing of the workpiece against the corner formed between the one projecting pin and the fence acts to position the saw blade perpendicular to the length of the workpiece at the desired distance from the pin-contacting end of the workpiece, as set by the previously selected location of that pin in terms of the selected hole in the fence and selected position of the fence along the worksurface.

After the first cut, the process of repositioning the workpiece is repeated, i.e. sliding the outer end of the workpiece past the next pin-equipped hole in the fence to automatically deploy this pin to it's stop-defining position, where that end of the workpiece can then be butted up against the pin and the side 24 of the fence to position the workpiece for the next desired cut.

FIG. 10 shows the fence centered on the length of the base, thus aligning therewith due to their equal lengths. However, due to the repositionality of the fence along the base when the clamping mechanism knobs 18 are loosened from a clamping condition bearing down on the fence, the fence 14 can later be repositioned without requiring removal of the base from the chop saw extension table, for example to shift laterally further away from the plane of the chop saw blade 66 to enable stop pin use further away from the blade for longer pieces of lumber or other material to be cut. Also, multiple base pieces 12 may be fastened to the worksurface end-to-end in an aligned parallel manner to set up a longer track-like guide along which one or more fences can be slidably adjusted in position. For such cooperation between multiple fences, the ends of each fence are flat or otherwise matingly profiled to fit an end of once fence conformingly against the opposite end of another fence when the two fences are positioned end-to-end on one or more base members 12. The distance between a respective end-hole in each fence's series of holes and the end of the fence nearest that end-hole is complimentary with the corresponding distance between the opposite end-hole in the series and the other end of the fence, so that such mating together of two identical fence's end to end will create a predetermined distance between the end-hole of once fence and the nearest end-hole of the other fence.

For the illustrated embodiment, the pin holes 22 are arranged in two linearly extending rows that are vertically spaced apart at the vertical side 24 from which the pins project to form the workpiece stops. In each row, each pair of adjacent holes are equally spaced apart in the longitudinal direction, and this inter-hole longitudinal spacing of each row is also equal from one row to the other. Except for the two end holes nearest the two ends of the fence, each hole of each row is centered between a pair of adjacent holes in the other row in the longitudinal direction. Such arrangement of multiple rows of pin-receiving holes allows for tighter spacing of the holes along the fence, thereby providing smaller increments of possible workpiece stop positions along the length of the fence, i.e. spacing between two adjacent holes in one row may be equal to or less than the required pin-accommodating hole bore diameter. In such an embodiment, where the distance between any two sequentially adjacent pins in the series is equal, each end hole in the series is spaced from the respective end of the fence is preferably half this predetermined inter-hole distance. This way, a user already having installed one fence can install a second fence at either end of the first without affecting the spacing between the end holes of the fences.

Applicant has found the present invention effective to significantly increase the speed of cutting multiple parts of one or more sizes by this pre-positioning or "programming" pin-type stops to drop by means of gravity into holes incrementally spaced along the length of a beam or rail-like fence to protrude from its front face when the assembly is connected or aligned with the fence of a cutting tool. A work piece is pressed against a series of "programmed" pins causing them to retract upwards into their respective openings. The work piece is moved laterally passed the opening toward the cutter and the pin re-deploys, a cut is made and the work piece is moved passed the next pin-loaded hole, releasing that pin to drop and so on.

The time and effort spent repositioning stops is reduced and a positive fluid motion reduces time between cuts. Low friction movement of pins in holes can be achieved by a predictable fit tolerance for accuracy, and the pin-in-hole configuration is simpler and easy to produce than larger more complex stop arrangements. The relatively small pin diameter and pin hole wall thickness allow for cuts to be made closer together.

The use of a slidable fit between a fastened base and a fence movable thereon allows for easy repositioning of the fence while maintaining the proper alignment relative to the tool. However, it will be appreciated that the advantages of the gravitationally fed pin-type stops may be employed regardless of how the pin-holding fence is held in the desired position on the work surface. While the illustrated embodiment employs two rows of pin-receiving holes and has equal spacing from one hole to the next through the series, other embodiments may depart from such a configuration, for example employing a single row or more than two rows, other patterns. Non-uniform hole spacing may be employed, for example, if the stop gauge is being produced for an application requiring particular tool action spacing increments not evenly divisible by a single achievable hole-spacing distance value. Also, while the illustrated embodiment employs fully removable pins that number less than the number of available holes, other embodiments may feature a pin for each hole and instead provide a seat on which a projecting feature extending radially outward to one side of the pin head can be seated by rotation of the pin to position the projection over the seat under sufficient withdrawal of the pin to pull its distal end back into the respective hole in the fence from its stop-defining position projecting outward therefrom. Embodiments employing a pin for each hole may employ non-removable pins, for example using attachment of an enlargement to the pin near its distal end in cooperation with counterboring of the respective hole at the side face 24 of the fence so that under retracting of the pin from its deployed stop-defining position, the enlargement fits within the counterbore in the fence, but blocks sliding of the pin's distal end fully through the fence due to the smaller diameter of the pin-receiving hole past the enlarged counterbored end thereof.

Also, while the hole-equipped rail or beam of the illustrated embodiment is to be positioned beside the workpiece to not only carry the stop-pins but also act as the fence for guiding the motion and orientation of the workpiece, other embodiments may instead employ a flip-down rail or beam that is hinged on a fence-defining base secured to the worksurface. In such an embodiment, the workpiece is first placed against the fence, from which the beam or rail is then flipped down over part of the workpiece from the fence-engaging edge thereof so that pins inserted in the select holes of the beam or rail will each depend or hang downward from the beam or rail past the elevation of the top surface of the workpiece when the top surface of slides past the hole in which that pin is received. In such an embodiment, the pins may hang purely vertical within non-sloping bores in the beam or rail when swung down into its useful over the workpiece, and so the present invention is not limited to obliquely sloping pin holes, as other gravitationally actuated pin-stop embodiments are appreciated.

While illustrated herein as used for a chop saw, it will be appreciated that the present invention may be used in combination with a variety of different stationary power tools, such as with table saws, radial arms saws, miter saws, drill presses, etc. Stationary is being used here to denote tools carried or mounted on some type of table, bench, stand or other support for use thereon, as opposed to handheld power tools supported by the operator's hands, and not necessarily being limited to permanent or semi-permanent tool installations, i.e. the overall tool setup may be portable for transport from one job site to another, yet be "stationary" in nature in terms of the condition of the overall tool setup while in use.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An automatic stop gauge for positioning a workpiece along a workpiece support surface of a tool setup to position the workpiece relative to a working member of the tool for engagement of the workpiece thereby at predetermined positions along the workpiece, the stop gauge comprising:
   a rail extending in a longitudinal direction and arranged for coupling to the workpiece support surface;
   a series of holes extending through the rail in a transverse direction oriented downwardly cross-wise to the longitudinal direction, the holes in the series having predetermined spacing between adjacent holes along the longitudinal direction; and
   a set of pins configured to be received within different ones of said holes in a free sliding condition in which each pin is freely slidable along the hole between a stop position in which a lower end of the pin projects outwardly from the rail and a retracted position in which the pin does not project outwardly from the rail;
   wherein the downward direction of the holes gravitationally biases each pin into the stop position when situated in the free sliding condition in one of the holes.

2. An automatic stop gauge for positioning a workpiece along a workpiece support surface of a tool setup to position the workpiece relative to a working member of the tool for engagement of the workpiece thereby at predetermined positions along the workpiece, the stop gauge comprising:
   a fence member extending in a longitudinal direction and presenting workpiece bearing surface extending in said longitudinal direction along an upright side of the fence member;
   a series of holes extending through the fence member in a transverse direction oriented cross-wise to the longitudinal direction and sloping downwardly toward the upright side of the rail member at an oblique angle thereto, the holes in the series having predetermined spacing between adjacent holes along the longitudinal direction; and
   a set of pins configured to be received within different ones of said holes in a free sliding condition in which each pin is freely slidable along the hole between a stop position in which a lower end of the pin projects outwardly past the workpiece bearing face of the fence member and a retracted position in which the pin does not project outwardly past the bearing face of the fence member;
   wherein the obliquely downward transverse direction of the holes gravitationally biases each pin toward the stop position when situated in the free sliding condition in one of the holes.

3. The stop gauge of claim 1 wherein the pins comprise shaft portions of cross-section small enough to fit within the holes and head portions too large to fit within the holes, whereby in the stop position, the shaft portion of each pin defines the lower end projecting from the rail and the head portion is seated at the end of the hole opposite that from which the lower end projects.

4. The stop gauge of claim 1 wherein the predetermined spacing between adjacent holes is equal for each pair of adjacent holes in the series.

5. The stop gauge of claim 1 wherein the series of holes comprises two rows of holes, holes of one row each being located between a pair of adjacent holes in the other row in the longitudinal direction.

6. The stop gauge of claim 5 wherein spacing apart of adjacent holes in the longitudinal direction in the one row is equal to spacing apart of adjacent holes in the longitudinal direction in the other row.

7. The stop gauge of claim 1 wherein a first end space between a first end hole adjacent a first end of the rail and said first end of the rail and a second end space between a second end hole adjacent a second end of the rail and said end are complimentary to maintain the predetermined spacing between adjacent holes among two series of holes in two of said rails when placed adjacent one another first end to second end.

8. The stop gauge of claim 7 wherein a distance between each pair of adjacent holes in the series is equal, and the first and second end spaces each equal half of said distance.

9. The stop gauge of claim 1 comprising a base arranged to mount atop the workpiece support surface and to carry the rail atop the base at user-selectable positions thereon to adjust a position of the rail over the workpiece support surface.

10. The stop gauge of claim 9 wherein the rail is slidable along the base to different user-selectable positions and selectively lockable to the base in any of said user-selectable positions.

11. The stop gauge of claim 10 wherein a bottom of the rail and a top of the base are profiled in a matable fashion defining a guide to direct sliding of the rail along the base in the longitudinal dimension.

12. The stop gauge of claim 11 comprising tongue and groove profiles defined on opposing ones of the rail and the base to define a mating tongue and groove pair extending in the longitudinal direction.

13. The stop gauge of claim 10 wherein a locking device comprises a clamping member arranged to engage onto the rail from thereabove and a clamping mechanism operable to tighten the clamping member downwardly onto the rail to clamp it against the base therebeneath.

14. The stop gauge of claim 13 wherein the clamping member comprises a channel of inverted U-shaped cross-section having a first downwardly depending leg engagable into an upwardly opening slot in the rail adjacent a second side thereof opposite a first side where the lower ends of the pins project from the rail in the stop position and a second downwardly depending leg at an end of a central span opposite the first leg for placement against a lateral portion the base extending laterally outward past the second side of the rail.

15. The stop gauge of claim 14 wherein the clamping mechanism comprises threaded posts extending upward from the lateral portion for receipt of said threaded posts through holes in the central span of the channel, and matingly threaded pieces threadable onto the posts from over the central span of the channel to clamp the channel against the rail and the base at the longitudinal slot and lateral portion respectively.

16. The stop gauge of claim 9 comprising fastener holes extending downwardly through the base for receipt of threaded fasteners therethough to anchor the base to the working surface.

17. The stop gauge of claim 1 wherein each pin is removably insertable among different holes in the series and manually withdrawable therefrom for selective repositioning of pins for different operations of the tool.

18. The stop gauge of claim 2 wherein the fence member comprises a sloped outer surface at ends of the holes opposite the work bearing surface, the sloped outer surface being normal to the transverse direction of said holes.

19. The stop gauge of claim 1 in combination with the tool setup, wherein the rail is coupled to the workpiece support surface and a lower end of each hole in the rail is positioned at a height spaced above the work surface.

20. The stop gauge of claim 2 in combination with the tool setup, wherein the upright side of the fence member stands upright from the workpiece support surface and a lower end of each hole in the fence member is positioned at a height spaced above the work surface.

* * * * *